(12) United States Patent
Dickey et al.

(10) Patent No.: US 10,954,080 B1
(45) Date of Patent: Mar. 23, 2021

(54) AUTOMATIC CONVERSION STATION

(71) Applicant: INTELLIGRATED HEADQUARTERS, LLC, Mason, OH (US)

(72) Inventors: Darin Dickey, Owings Mills, MD (US); William McConnell, Owings Mills, MD (US)

(73) Assignee: Intelligrated Headquarters, LLC, Mason, OH (US)

(*) Notice: Subject to any disclaimer, the term of this patent is extended or adjusted under 35 U.S.C. 154(b) by 0 days.

(21) Appl. No.: 16/595,715

(22) Filed: Oct. 8, 2019

(51) Int. Cl.
*B65G 47/90* (2006.01)
*B65G 37/00* (2006.01)
*B65G 47/52* (2006.01)

(52) U.S. Cl.
CPC ......... *B65G 47/902* (2013.01); *B65G 37/005* (2013.01); *B65G 47/52* (2013.01); *B65G 2207/46* (2013.01)

(58) Field of Classification Search
CPC ............ B65G 47/5181; B65G 47/2445; B65G 47/248; B65G 47/904; B65G 47/902; B65G 37/005; B65G 47/52; B65G 59/00; B65G 59/06
USPC .......... 198/406, 407, 409; 414/788.8, 789.9, 414/790.2
See application file for complete search history.

(56) References Cited

U.S. PATENT DOCUMENTS

| 5,292,114 | A | | 3/1994 | McConnell |
| 5,350,128 | A | * | 9/1994 | Deters ................. B65G 47/248 198/465.1 |
| 8,142,133 | B2 | | 3/2012 | Neebe et al. |
| 9,782,802 | B2 | | 10/2017 | Berdelle-Hilge et al. |
| 2002/0110441 | A1 | * | 8/2002 | Padovani ............. B65G 47/902 414/416.09 |
| 2005/0281662 | A1 | * | 12/2005 | Carey .................. B65G 47/252 414/765 |
| 2007/0201968 | A1 | * | 8/2007 | Good ....................... B07C 1/00 414/265 |

(Continued)

FOREIGN PATENT DOCUMENTS

KR   2012-0047652 A   5/2012

OTHER PUBLICATIONS

Flats Sequencing System for Inquiring Minds, United States Postal Services Handbook for Employees and Customers, [online], 2008, [retrieved Feb. 18, 2020], retrieved from the Internet, URL: http://www.nalc3825.com/FSS_minds.pdf, 12 pages.

*Primary Examiner* — James R Bidwell
(74) *Attorney, Agent, or Firm* — Alston & Bird LLP

(57) ABSTRACT

A conversion assembly for transferring an item from a first tray to a second tray. The conversion assembly includes a paddle assembly, a first tine assembly comprising one or more tines coupled to a first rotating shaft, and a second tine assembly comprising one or more tines coupled to a second rotating shaft. The first tine assembly is configured to facilitate emptying the item from the first tray onto the paddle assembly and the second tine assembly is configured to facilitate moving the first tray to a second conveyor while the item remains on the paddle assembly. The first tine assembly alters an orientation of the second tray to a position to receive the item from the paddle assembly, and wherein the paddle assembly is configured to move the second tray and the item back onto a first conveyor.

20 Claims, 10 Drawing Sheets

(56) References Cited

U.S. PATENT DOCUMENTS

2008/0011583 A1* 1/2008 Beck .................... B65G 39/125
198/586
2009/0317224 A1* 12/2009 Neebe ....................... B07C 3/00
414/788.8

* cited by examiner

AUTOMATIC CONVERSION STATION

TECHNOLOGICAL FIELD

The present disclosure relates generally to an automatic conversion station, and, more particularly, to an automatic conversion station used in a warehouse environment for transferring items from one tray to another tray.

BACKGROUND

Material handling systems can convey, sort, and organize items (e.g. cartons, cases, containers, shipment boxes, totes, packages, mails, polybags and/or the like) at high speeds. Depending on a configuration of the material handling systems, the items may travel through various locations in a warehouse in an unregulated manner, or may be repositioned, reoriented, consolidated, and sorted to a destination location. Material handling systems may comprise a conveyor controller and/or warehouse management system to facilitate organization of items being conveyed and/or handled in the warehouse at the various locations.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein, relates to a conversion station for moving an item from a first tray to a second tray. The conversion station includes a first conveyor to receive the first tray and the second tray. A second conveyor positioned at a predefined height offset from the first conveyor to receive the first tray after the item has been removed from the first tray. A conversion assembly positioned in between the second conveyor and the first conveyor, wherein the conversion assembly includes a first tine assembly comprising one or more tines coupled to a first rotating shaft and a second tine assembly comprising one or more tines coupled to a second rotating shaft. The second tine assembly is positioned at a predefined height offset from the first tine assembly. The first tine assembly is configured to facilitate emptying the item from the first tray onto a paddle assembly of the conversion assembly and the second tine assembly is configured to facilitate moving the first tray to the second conveyor while the item remains on the paddle assembly. The first tine assembly alters an orientation of the second tray to a position to receive the item from the paddle assembly, and wherein the paddle assembly is configured to move the second tray and the item back onto the first conveyor.

Various example embodiments described herein, relates to a conversion station with the first conveyor including a clamping unit with at least two clamping devices positioned opposite to each other to engage with the item in the first tray on the first conveyor, wherein each of the clamping devices is horizontally and vertically adjustable.

Various example embodiments described herein, relates to a conversion station with a clamping unit including at least two clamping devices are actuated along the vertical axis and the horizontal axis, wherein each of the clamping devices is vertically actuated using a scissor style linkage mechanism operated by a first electric motor, and wherein each of the clamping devices is horizontally actuated using a common lead screw with right-hand threads on one half and left-hand threads on the other half and operated by a second electric motor.

Various example embodiments described herein, relates to a conversion station with the first conveyor including additional openings to accommodate the at least two clamping devices underneath the first conveyor, wherein the additional openings provide a clearance for the at least two clamping devices to be vertically lifted from underneath the first conveyor.

Various example embodiments described herein, relates to a conversion station with the paddle assembly including at least two adjustable paddles coupled to a third rotating shaft, wherein the paddle assembly is positioned in between and offset from the first tine assembly and the second tine assembly.

Various example embodiments described herein, relates to a conversion station with the first rotating shaft, the second rotating shaft, and the third rotating shaft are attached at different heights offset from each other on a support structure of the conversion assembly.

Various example embodiments described herein, relates to a conversion station with each of the first rotating shaft, the second rotating shaft, and the third rotating shaft driven by at least one drive unit comprising a drive motor, a drive shaft and a timing belt.

Various example embodiments described herein, relates to a conversion station with the one or more tines of the second tine assembly including at least one gripper to grip the first tray and move the first tray to the second conveyor.

Various example embodiments described herein, relates to a conversion station with the conversion assembly further including a chute and a catch pan positioned at a bottom of the support structure to receive one or more items slipping from the conversion assembly when moving the one or more items from the first tray to the second tray.

Various example embodiments described herein, relates to a conversion station with the first tine assembly further including solenoids that are selectively activated to grip and position the first tray and the second tray.

Various example embodiments described herein, relates to a conversion station, wherein the first conveyor and the second conveyor are roller conveyors with gaps to accommodate the one or more tines therebetween.

Various example embodiments described herein, relates to a conversion assembly for transferring an item from a first tray to a second tray. The conversion assembly includes a paddle assembly, a first tine assembly including one or more tines coupled to a first rotating shaft, and a second tine assembly including one or more tines coupled to a second rotating shaft. The second tine assembly is positioned at a predefined height offset from the first tine assembly. The first tine assembly is configured to facilitate emptying the item from the first tray onto the paddle assembly of the conversion assembly and the second tine assembly is configured to facilitate moving the first tray to a second conveyor while the item remains on the paddle assembly. The first tine assembly alters an orientation of the second tray to a position to receive the item from the paddle assembly, and wherein the paddle assembly is configured to move the second tray and the item back onto a first conveyor.

Various example embodiments described herein, relates to a conversion assembly with the paddle assembly including at least two adjustable paddles coupled to a third rotating shaft, wherein the paddle assembly is positioned in between and offset from the first tine assembly and the second tine assembly.

Various example embodiments described herein, relates to a conversion assembly with the paddle including at least two adjustable paddles that are horizontally adjustable within paddle mounting slots provided on the paddle assembly based on a size of the item on the incoming tray.

Various example embodiments described herein, relates to a conversion assembly, wherein the first rotating shaft, the second rotating shaft, and the third rotating shaft are attached at different heights offset from each other on a support structure of the conversion assembly.

Various example embodiments described herein, relates to a conversion assembly, wherein each of the first rotating shaft, the second rotating shaft, and the third rotating shaft is driven by at least one drive unit comprising a drive motor, a drive shaft and a timing belt.

Various example embodiments described herein, relates to a conversion assembly, wherein the support structure comprises one or more support frames to support the first tine assembly, the paddle assembly and the second tine assembly.

Various example embodiments described herein, relates to a conversion assembly, wherein the one or more support frames comprise a first support frame, a second support frame and a third support frame, wherein the third support frame is positioned above and parallel to the first support frame and offset at a predetermined height from first support frame, and wherein the second support frame is inclined at an angle and substantially perpendicular with respect to the first support frame and the third support frame.

Various example embodiments described herein, relates to a conversion assembly, wherein the first tray and the second tray are in an inverted position when supported on the paddle assembly.

Various example embodiments described herein, relates to a conversion assembly, wherein the one or more tines are altered from a home position to a work position and vice-versa to alter the orientation of the first tray and the second tray.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
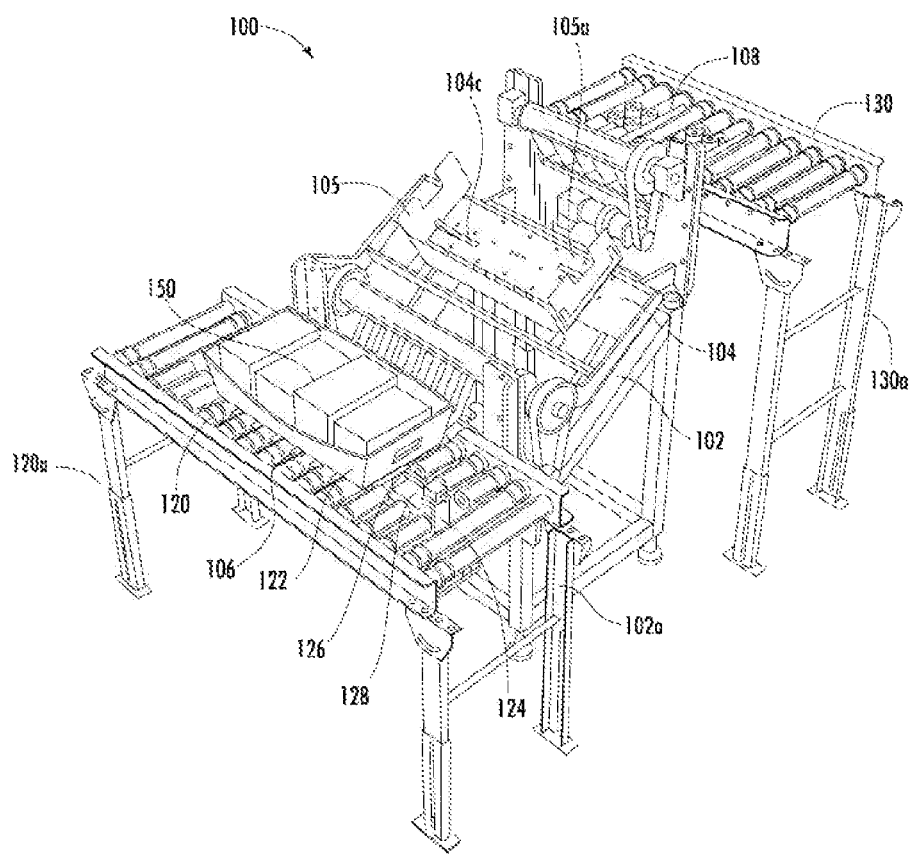
FIG. 1 illustrates a perspective view of a conversion station, in accordance with an embodiment of the present disclosure.

Some embodiments of the present disclosure will now be described more fully hereinafter with reference to the accompanying drawings, in which some, but not all embodiments are shown. Indeed, the concepts described here may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

Turning now to the drawings, the detailed description set forth below in connection with the appended drawings is intended as a description of various configurations and is not intended to represent the only configurations in which the concepts described herein may be practiced. The detailed description comprises specific details for the purpose of providing a thorough understanding of various concepts with like numerals denote like components throughout the several views. However, it will be apparent to those skilled in the art that these concepts may be practiced without these specific details.

As used herein, the terms "container," "tote", "tray" and similar terms may be used interchangeably. All these terms may represent holders for one or more items to be placed. The term "first tray" may refer to a flexible, corrugated tray and the term "second tray" may refer to a rigid, plastic tray of larger dimension than the "first tray". Thus, use of any such terms should not be taken to limit the spirit and scope of embodiments of the present disclosure.

In addition, the terms "item" or "items", "articles" and similar terms may be used interchangeably. The term "item" may refer to a single item, such as a package and the term "items" may refer to a group of items, such as a group or stack of mail pieces or poly bags. Thus, use of any such terms should not be taken to limit the spirit and scope of embodiments of the present disclosure.

Further, the terms "work position" and "home position or initial position or rest position" refers to different angled positions at which tine assemblies and paddle assembly can be oriented. The term "work position" of the fine tine assembly and the second tine assembly refers to the angled position at which these tine assemblies are away from the first conveyor and the second conveyor. The term "work position" of the paddle assembly refers to the angled position at which the paddle assembly is positioned away from its support frame. Thus, use of any such terms should not be taken to limit the spirit and scope of embodiments of the present disclosure.

Further, the terms "first position" and "second position" refers to different positions at which the tray or the tray containing the can be positioned or oriented in accordance with embodiments of the present disclosure. The term "first position" refers to a position at which the bottom surface of the tray is in contact with the conveyor and the "second position" refers to a position at which the bottom surface of the tray is out of contact with the conveyor. Thus, use of any such terms should not be taken to limit the spirit and scope of embodiments of the present disclosure.

Further, the term "adjustable paddle" refer to the paddle which can move or slide in a horizontal or vertical axis to re-position itself at different stages when handling the trays or the items contained in the trays. Thus, use of any such terms should not be taken to limit the spirit and scope of embodiments of the present disclosure.

Further, the term "clamping device" refers to any device which has a clamping end to hold the items within the tray using pressing force or a suction force. Thus, use of any such terms should not be taken to limit the spirit and scope of embodiments of the present disclosure.

Further, the term "predefined time interval" refers to a time elapsed after an event or a process or a step is completed at the conversion station. Thus, use of any such terms should not be taken to limit the spirit and scope of embodiments of the present disclosure.

Further, the term "one or more sensors" refers to phot-eye sensors installed on the conveyors at a known position or imaging devices installed above the conveyors or the conversion station. Thus, use of any such terms should not be taken to limit the spirit and scope of embodiments of the present disclosure.

Further, the term "input signals" refers to digital signals transmitted by the sensors to activate or de-activate components associated with the conversion station.

Further, the term "controller" refers to a central or supervisory controller capable of operating other controllers or components associated with the conversion station. The term "controller" may also refers to a motor controller associated with several components of the conversion station. Thus, use of any such terms should not be taken to limit the spirit and scope of embodiments of the present disclosure.

Generally, in a warehouse environment, when items travel through different stages of material handling, they are subjected to certain level of manual handling. For example, an operator personnel may manually remove items contained within a tote or a tray to induct into a conveyor system or any other automated machines used in the warehouse environment. Often, such manual handling may require additional effort and time, specifically, when removing smaller items from within the tote or tray. Further, during the manual handling, due to volume of items contained within the tray, there exists a possibility of slippage from the hands of the operator personnel when handling the items in a bulk.

Often when the tray containing the smaller items, for example, mail pieces or poly bags, is passed through different stages of material handling, there exists a possibility that the tray might be subjected to damage due to rough handling and the tray may lack sufficient rigidity or structural integrity to operate in conjunction with certain material handling equipment. In such scenarios, it is required to exchange the items from one tray to another tray before the tray containing the items is proceeded to the further stages of processing in the warehouse. Therefore, it may be required to manually transfer the items using manual labor from one tray to another tray. Generally, in the warehouse environment, manual processing station are set up in which the operator personnel pull out the tray travelling on a conveyor and transfer the items from that tray to another tray and push it back to another conveyor for further processing. Such manual handling of the items may be laborious and time consuming.

Various example embodiments described herein relates to an automated conversion station with a conversion assembly for transferring items from a first tray to a second tray automatically without any involvement of human labor. The conversion assembly includes a paddle assembly, a first tine assembly, and second tine assembly. The first tine assembly includes one or more tines coupled to a first rotating shaft. The second tine assembly includes one or more tines coupled to a second rotating shaft. The second tine assembly is positioned at a predefined height offset from the first tine assembly, wherein the first tine assembly is configured to facilitate emptying the item from the first tray onto the paddle assembly of the conversion assembly and the second tine assembly is configured to facilitate moving the first tray to a second conveyor while the item remains on the paddle assembly. Further, the first tine assembly alters an orientation of the second tray to a position to receive the item from the paddle assembly, and wherein the paddle assembly is configured to move the second tray and the item back onto a first conveyor.

According to some example embodiments, the automated conversion station may include the conversion assembly, a first conveyor and a second conveyor. The first conveyor may receive the first tray with one or more items contained within the first tray. The one or more items in the first tray may be emptied by the conversion assembly. The second conveyor may receive the emptied first tray without the one or more items. Further, the first conveyor receives the second tray and the conversion assembly loads the one or more items emptied from the first tray into the second tray.

In the following detailed description of exemplary embodiments of the disclosure, specific representative embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

FIG. 1 illustrates a perspective view of a conversion station 100, in accordance with an embodiment of the present disclosure. The conversion station 100 includes a conversion assembly 102, a first conveyor 120 and a second conveyor 130. The conversion assembly 102 may be positioned in between the first conveyor 120 and the second conveyor 130. According to an embodiment, the first conveyor 120 and the second conveyor 130 may be replaced by two stationary work tables (not shown). According to another embodiment, one stationary work table and one conveyor may be used. As shown in FIG. 1, the first conveyor 120 may be positioned on a first frame structure 120a and the second conveyor 130 may be positioned on a second frame structure 130a. In alternate embodiments, the first conveyor 120 and the second conveyor 130 may be installed on a common frame structure. As shown in FIG. 1, the conversion assembly 102 is supported on another support structure 102a separate from the first frame structure 120a and the second frame structure 130a. In alternate embodiments, the conversion assembly 102, the first conveyor 120, and the second conveyor 130 may be installed on a common frame structure. In yet another embodiment, the conversion assembly 102 and the first conveyor 120 may be installed on a common frame structure. As shown in FIG. 1, the first conveyor 120 and the second conveyor 130 may be roller conveyors. In some examples, the roller conveyors may be motorized roller (MDR) conveyors. In some examples, the roller conveyors may be belt-driven roller conveyors. According to an embodiment, the first conveyor 120 may be positioned at a first height and the second conveyor 130 may be positioned at a second height. In FIG. 1, the second conveyor 130 is positioned at a predefined height offset from the first conveyor 120 to receive trays after items 150 from the trays has been removed by the conversion assembly 102.

According to an embodiment, the first conveyor 120 receives a first tray 122. According to an embodiment, the second conveyor 130 receives the first tray 122 after an item 150 has been removed from the first tray 122 by the conversion assembly. According to an embodiment, the second conveyor 130 receives the first tray 122 while the item 150 contained within the first tray 122 remain on the conversion assembly. According to an embodiment, the first conveyor 120 receives another tray while the second conveyor 130 receives the first tray 122 and the item 150 contained within the first tray 122 remain on the conversion assembly.

The clamping devices 126 may be used to clamp with the item 150 contained within the trays arriving at the first conveyor 120. When the first conveyor 120 receives the first tray 122, the clamping unit 124 may be lifted from underneath the first conveyor 120 and the clamping devices 126 may move horizontally towards the first tray 122 from either side of the first tray 122 to clamp with the item 150 contained in the first tray 122. For example, the first conveyor 120 may include one or more sensors (not shown), such as, but not limited to photo-eye sensors, to detect presence of the first tray 122 on the first conveyor 120 and may trigger an input signal to a controller (not shown) of the clamping unit 124 to move the clamping unit 124 from underneath the first conveyor 120 to a predefined position. The clamping devices 126 may move either vertically or horizontally along the vertical axis or the horizontal axis to clamp with the item 150 of the first tray 122 in the predefined position. In some examples, the predefined position may be a maximum height limit to which the clamping unit 124 can be lifted. According to an embodiment, the controller may be a motor controller operating the first electric motor and the second electric motor in response to the input signals from the one or more sensors. In some examples, one or more sensors may be imaging devices (not shown) positioned on or around the first conveyor 120 to detect a presence of the first tray 122 and item 150 positioned within the first tray 122. The images obtained from the imaging devices may be used as the input signal to the controller to control a movement of the clamping unit 124 and the clamping devices 126. The construction and working of the conversion assembly 102 in conjunction with the first conveyor 120 and the second conveyor 130 will be described in detail in FIGS. 2-9.

Figure 2:
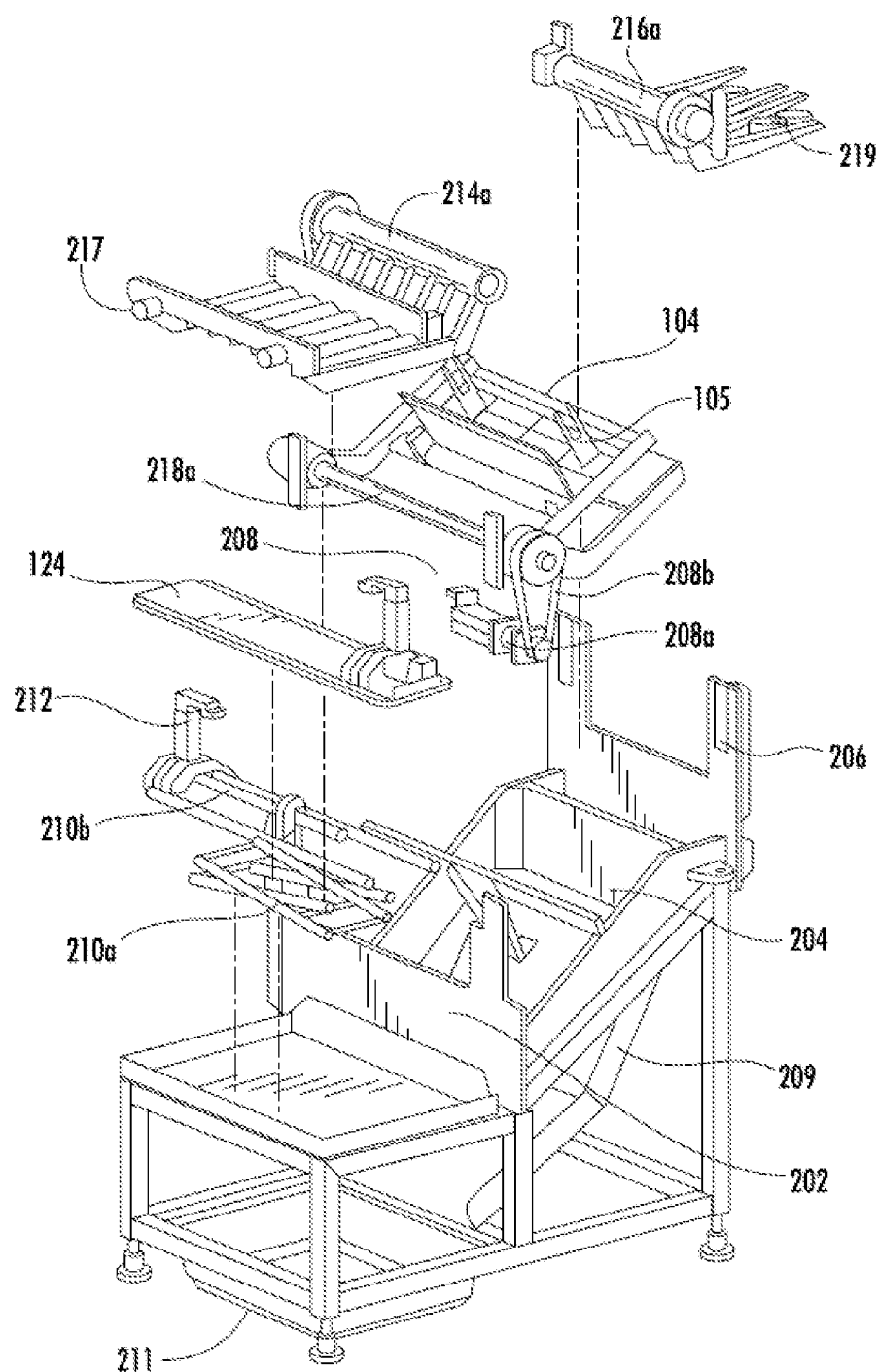
FIG. 2 illustrates an exploded view of a conversion assembly of the conversion station of FIG. 1, in accordance with an embodiment of the present subject matter.

FIG. 2 illustrates an exploded view of a conversion assembly 102 of the conversion station 100 of FIG. 1, in accordance with an embodiment of the present subject matter. The conversion assembly 102 facilitates transferring an item 150 from one tray to another tray. The conversion assembly 102 includes a paddle assembly 104, a first tine assembly 106, and a second tine assembly 108. The first tine assembly 106 includes one or more tines coupled to a first rotating shaft 214a. The second tine assembly 108 comprising one or more tines coupled to a second rotating shaft 216a. The second tine assembly 108 is positioned at a predefined height offset from the first tine assembly 106. The first tine assembly 106 and the second tine assembly 108 alters an orientation of the trays when the tine assemblies 106, 108 move from a home position to a work position or vice-versa. According to an embodiment, the second tine assembly 108 includes one or more suction cups 219 attached to the one or more tines. The suction cups 219 are configured to pick the first tray 122 from the paddle assembly 104 and place it on the second conveyor 130. According to an embodiment, the first tine assembly 106 further includes solenoids 217 that are selectively activated to grip and position the first tray 122 and the second tray 602. In some example, the first conveyor 120 and the second conveyor 130 are provided with gaps in between their rollers to accommodate the one or more tines of the first tine assembly 106 and the second tine assembly 108 therebetween.

FIG. 2 illustrates an exploded view of a conversion assembly 102 of the conversion station 100 of FIG. 1, in accordance with an embodiment of the present subject matter. The conversion assembly 102 facilitates transferring an item 150 from one tray to another tray. The conversion assembly 102 includes a paddle assembly 104, a first tine assembly 106, and a second tine assembly 108. The first tine assembly 106 includes one or more tines coupled to a first rotating shaft 214a. The second tine assembly 108 comprising one or more tines coupled to a second rotating shaft 216a. The second tine assembly 108 is positioned at a predefined height offset from the first tine assembly 106. The first tine assembly 106 and the second tine assembly 108 alters an orientation of the trays when the tine assemblies 106, 108 move from a home position to a work position or vice-versa. According to an embodiment, the second tine assembly 108 includes one or more suction cups 219 attached to the one or more tines. The suction cups 219 are configured to pick the first tray 122 from the paddle assembly 104 and place it on the second conveyor 130. According to an embodiment, the first tine assembly 106 further includes solenoids 217 that are selectively activated to grip and position the first tray 122 and the second tray 602. In some example, the first conveyor 120 and the second conveyor 130 are provided with gaps in between their rollers to accommodate the one or more tines of the first tine assembly 106 and the second tine assembly 108 therebetween.

According to an embodiment, the paddle assembly 104 includes at least two adjustable paddles 105 coupled to a third rotating shaft 218a, wherein the paddle assembly 104 is positioned in between and offset from the first tine assembly 106 and the second tine assembly 108. Further, the paddle assembly 104 includes a lower support plate 104b positioned below the adjustable paddles 105. In some examples, the adjustable paddles 105 are substantially U-shaped paddles. The adjustable paddles 105 may be slidably moved on a paddle mounting slot 104c, for example, a sliding rail along a horizontal axis. For example, the adjustable paddles 105 may be moved towards and away from each other using the paddle mounting slots 104c. In some examples, one of the adjustable paddles 105 may be fixed and the other of the adjustable paddles 105 may be configured to slide along the horizontal axis. In some examples, the distance between the two adjustable paddles 105 may be fixed. In some examples, the distance between the two adjustable paddles 105 may be dynamically adjusted based on a dimension of the tray to be handled by the paddle assembly 104. For example, the distance between the two adjustable paddles 105 may be controlled by a controller in response to a length of the tray incoming at the first conveyor 120. The one or more sensors at the first conveyor 120 may determine the length of the first tray 122 and provide an input signal to the controller. The controller may in turn adjust the distance between the two adjustable paddles 105 proportional to the length of the first tray 122. In some examples, the imaging devices may detect the length of the item 150 inside the first tray 122 and provide an input signal to the controller to adjust the distance between the two adjustable paddles 105 proportional to the length of the item 150 contained within first tray 122. Further, the lower support plate 104b may be used to support a portion of the first tray 122 while the adjustable paddles 105 hold the items 150 in the first tray 122.

According to an embodiment, the first rotating shaft 214a, the second rotating shaft 216a, and the third rotating shaft 218a may be attached at different heights offset from each other on a support structure 102a of the conversion assembly 102. The support structure 102a comprises one or more support frames to support the first tine assembly 106, the paddle assembly 104 and the second tine assembly 108. The one or more support frames comprise a first support frame 202, a second support frame 204 and a third support frame 206. The third support frame 206 is positioned above and parallel to the first support frame 202 and offset at a predetermined height from first support frame 202. The second support frame 204 is inclined at an angle and substantially perpendicular with respect to the first support frame 202 and the third support frame 206. The first rotating shaft 214a, the second rotating shaft 216a, and the third rotating shaft 218a are driven by at least one drive unit 208 comprising a drive motor 208a and a timing belt 208b. In some examples, the first rotating shaft 214a the second rotating shaft 216a, and the third rotating shaft 218a are driven by separate drive units with each drive unit including the drive motor 208a, the drive shaft 208b and the timing belt 208c.

According to an embodiment, the conversion assembly 102 includes a chute 209 and a catch pan 211. The chute 209 may be positioned beneath the second support frame 204, for example, beneath the paddle assembly 104. The catch pan 211 is positioned below the chute 209 and the clamping unit 124 of the first conveyor 120. The chute 209 is configured to guide the item 150 slipping off the paddle assembly 104 into the catch pan 211. In operation, the first tine assembly 106 is configured to facilitate emptying the item 150 from the first tray 122 onto the paddle assembly 104 and the second tine assembly 108 with the suction cups 219 configured to facilitate moving the first tray 122 to the second conveyor 130 while the item 150 remain on the paddle assembly 104. During the moving of the first tray 122 if the item 150 slips off the first tray 122, the chute 209 may guide the item 150 into catch pan 211 smoothly without any damage due to the slippage.

Figure 3:
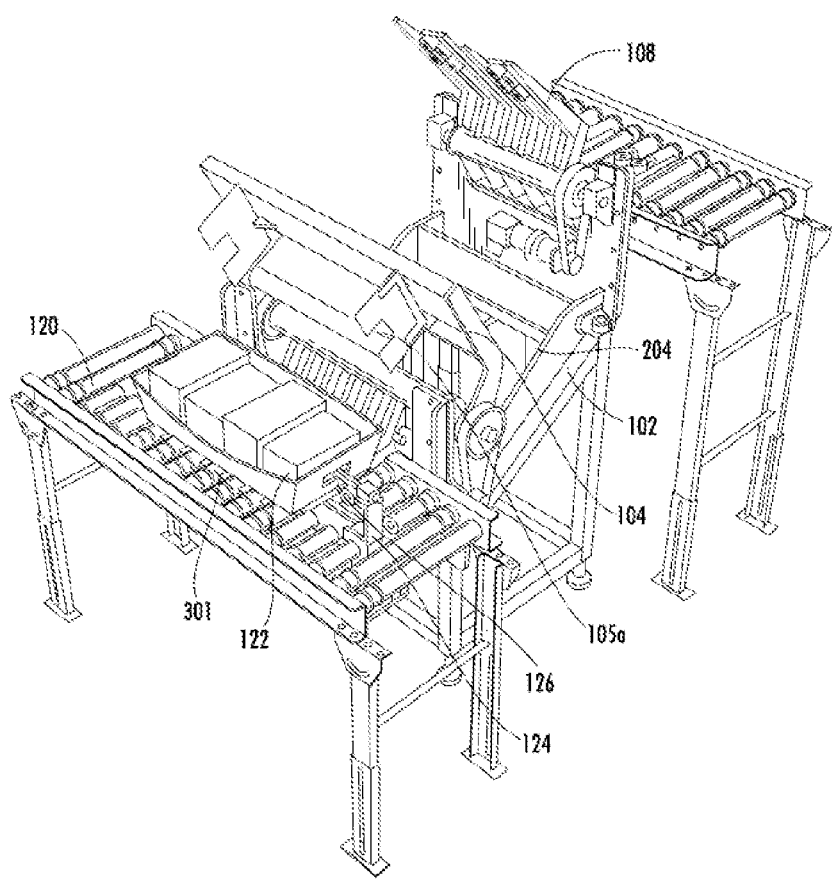
FIG. 3 illustrates a perspective view of the conversion station with a first tray in a first position, in accordance with an embodiment of the present subject matter.

FIG. 3 illustrates a perspective view of the conversion station 100 with a first tray 122 in a first position 301, in accordance with an embodiment of the present subject matter. As shown in FIG. 3, the first tray 122 is positioned on the first conveyor 120 in the first position 301 which may be a predetermined position for the clamping unit 124 to clamp with the item 150 contained in the first tray 122. For example, the one or more sensors of the first conveyor 120 may detect a presence of the first tray 122 incoming at the first conveyor 120 and may activate one or more rollers of the first conveyor 120 to guide the first tray 122 to the predetermined position. The one or more sensors may detect the presence of the first tray 122 at the predetermined position and may send an input signal to the controller of the clamping unit 124 to activate the claiming unit. In some examples, the clamping unit 124 may be activated at predefined time interval after the presence of the first tray 122 is detected by the one or more sensors. The clamping devices 126 may move towards the first tray 122 to clamp and hold the item 150 in the first tray 122. For example, a clamping end 212 of the clamping devices 126 may be inserted through an opening 123 provided on the first tray 122 to mate with the item 150 contained in the first tray 122. The clamping end 212 of each of the clamping devices 126 may be in pressing or a squeezing contact with the item 150 of the first tray 122 to hold the item 150 under pressure created by the clamping ends 212 of the clamping devices 126. In some examples, the clamping ends 212 may be suction cups or a metal iron pieces capable of holding the item 150 intact within the first tray 122. According to an embodiment, when the first tray 122 is in the first position 301, a lower surface of the first tray 122 may be supported by the one or more tines of the first tine assembly 106. For example, when the first tray 122 is in the first position 301, the one or more tines may abut the lower surface of the first tray 122. In some examples, in the first position 301, the one or more tines may be positioned beneath the first tray 122 and with a clearance to the lower surface of the first tray 122. In the first position 301, the one or more tines of the first tine assembly 106 and the second tine assembly 108 are in the home position. In the first position 301, the paddle assembly 104 is configured to undergo a transition from a home position to a work position as shown in FIG. 4.

Figure 4:
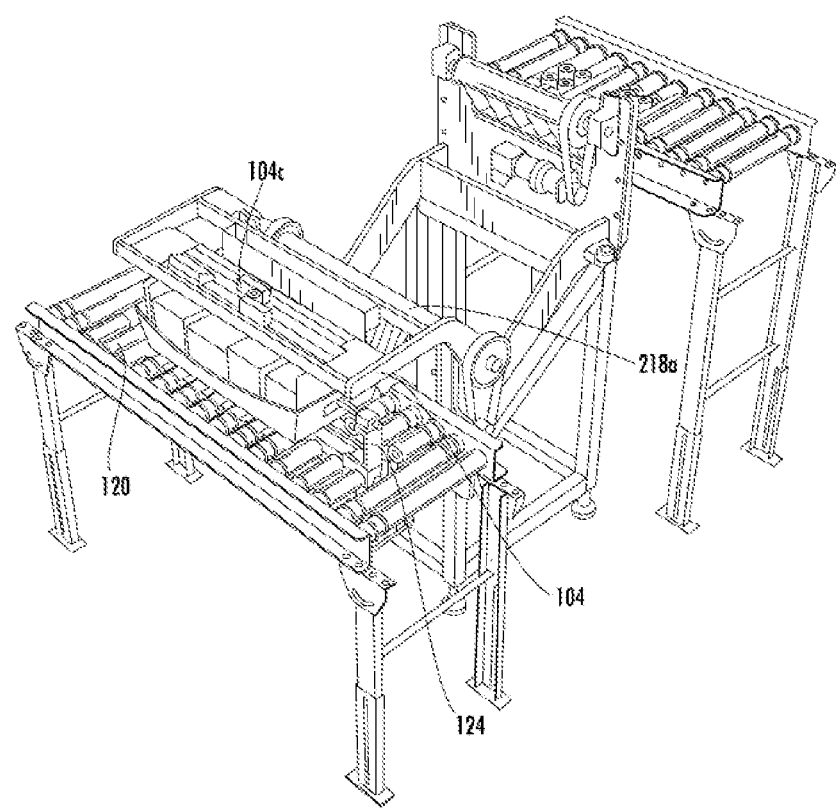
FIG. 4 illustrates a perspective view of the conversion station with the first tray in the first position and a paddle assembly in a work position, in accordance with an embodiment of the present subject matter.

In FIG. 4, the first tray 122 is in the first position 301 and the paddle assembly 104 is in the work position. For example, in the first position 301, the two clamping devices 126 may hold the item 150 intact under influence of a force caused by a forward motion of the two clamping devices 126 from either side of the first tray 122. While the item 150 is held intact by the two clamping devices 126, the paddle assembly 104 may be configured to move from the home position to the work position. For example, in the home position, the paddle assembly 104 may be positioned on the second support frame 204 of the support structure 102. The paddle assembly 104 may be shifted from the home position to the work position by a rotation of the third rotating shaft 218a. While the item 150 is held intact by the two clamping devices 126, the paddle assembly 104 may be positioned above the item 150 of the first tray 122. The two adjustable paddles 105 of the paddle assembly 104 may be positioned inside the first tray 122 and the item 150 contained in the first tray 122 may be held between the two adjustable paddles 105. In some examples, each of the adjustable paddles 105 include inverted U-shaped cut out 105a and when the paddle assembly 104 is in the work position, the inverted U-shaped cut out 105a is positioned above the clamping end 212 of the clamping devices 126 with a clearance therebetween. For example, the one or more sensors of the first conveyor 120 may sense the position of the clamping end 212 of the clamping devices 126 and accordingly adjust a position of the adjustable paddles 105 by sliding the paddles in the horizontal axis such that the inverted U-shaped cut out 105a coincides with the clamping end 212 when the paddle assembly 104 is transformed to the work position. In some examples, the position of the clamping end 212 may be obtained by processing images captured by the one or more imaging devices. In some examples, the positon of the clamping end 212 may be measured by calculating the distance traveled by the clamping end 212 from an initial position to a final position to contact the items 150 of the first tray 122. The distance traveled may be calculated by optic sensors, such as laser sensors. In some examples, the position of the clamping end 212 of the clamping devices 126 and the position of the adjustable paddles 105 may be pre-calibrated to be parallel with each other when the paddle assembly 104 transforms to the work position. When the paddle assembly 104 is transformed to the work position, the adjustable paddles 105 abut against the outer surface of the item 150 contained within the first tray 122. For example, if the first tray 122 contains one or more items 150, such as, but not limited to, a group of mail pieces, these one or more items 150 may be held in the form of a stack inside the first tray 122 by using the clamping devices 126. When the paddle assembly 104 is transformed to the work position, the adjustable paddles 105 abut against the outer surface of the stack. According to an embodiment, the paddle assembly 104 may not abut the outer surface of the item 150 when transformed to the work position. In such scenarios, the adjustable paddles 105 may be adjusted to abut and hold the item 150 after the paddle assembly 104 transforms into the work position. For example, the one or more sensors of the first conveyor 120 may detect the position of the adjustable paddles 105 and send an input signal to the controller to slide the adjustable paddles 105 in the horizontal axis toward the item 150 such that it abuts the outer surface of the item 150 and holds the item 150 under the influence of force created by the horizontal motion of the two adjustable paddles 105 towards the outer surface of the item 150. Thus, the item 150 is held intact in its current position by a pressing contact or squeezing contact of the two adjustable paddles 105.

According to an embodiment, while the two adjustable paddles 105 are in pressing contact with the item 150 or a stack of items 150, the clamping end 212 of the two clamping devices 126 is configured to move away from the item 150 in a rearward motion releasing the item 150 from contact with the clamping end 212. For example, the clamping end 212 may move away from the item 150 rearwardly along the horizontal axis after a predefined time interval after the transformation of the paddle assembly 104 to the work position. In some examples, the one or more sensors may sense the position of the adjustable paddles 105 and trigger an input signal to the controller of the clamping unit 124 to start the rearward motion of the clamping devices 126. For example, the adjustable paddles 105 may clear a light path of a first photo eye sensor and a block a light path of a second photo eye sensor when sliding towards the item 150 in the first tray 122 in the work position. Thus, by using known position of the second photo eye sensor and its known distance from the first phot eye sensor, the position of the adjustable paddle may be determined. The determined position may be used to trigger the input signal to the controller of the clamping unit 124 to retract the clamping end 212 of the two clamping devices 126 that is in squeezing contact with the item 150 in the first tray 122. In some examples, the clamping end 212 returns to its initial position and the clamping unit 124 is lowered back beneath the first conveyor 120. While the clamping unit 124 is lowered, the paddle assembly 104 in contact with the item 150 of the first tray 122 is transformed from the work position back to its home position as shown in FIG. 5.

Figure 5:
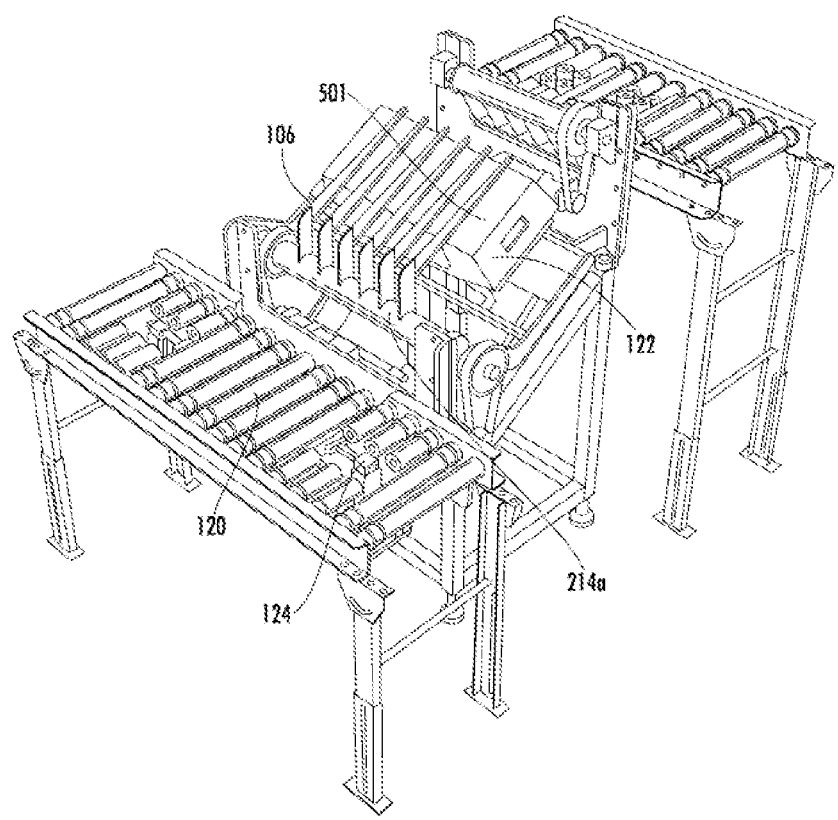
FIG. 5 illustrates a perspective view of the conversion station with the first tray in a second position and a first tine assembly in a work position, in accordance with an embodiment of the present subject matter.

In FIG. 5, while the paddle assembly 104 is transformed to the home position, it is seen that the first tine assembly 106 is transformed from its home position to a work position. The paddle assembly 104 and the first tine assembly 106 are transformed simultaneously such that the first tray 122 along with the item 150 are transferred and supported on the paddle assembly 104. As shown in FIG. 5, the first tray 122 is now in a second position 501 with the one or more tines of the first tine assembly 106 supporting the lower surface of the first tray 122. According to an embodiment, the first rotating shaft 214a and the third rotating shaft 218a are operated simultaneously by the controller of the conversion assembly. For example, when the one or more photo eye sensors senses that the coupling end has moved away from the first tray 122, it triggers an input signal to the controller to operate the paddle assembly 104 and the first tine assembly 106 simultaneously such that the first tray 122 along with the item 150 are transformed to the second position 501 as shown in FIG. 5. According to an embodiment, the first rotating shaft 214a and the third rotating shaft 218a may be operated sequentially by the controller of the conversion assembly. For example, after the adjustable paddles 105 contact the item 150 within the first tray 122, the controller may operate the third rotating shaft 218a to transform the paddle assembly 104 to the home position and after a predetermined time interval, the controller may operate the first rotating shaft 214a to transform the fine tine assembly to the work position, thereby, shifting the item 150 and the first tray 122 sequentially to the second position 501.

According to an embodiment, the first tine assembly 106 may be transformed back to its home position after a predefined time interval. The predefined time interval may be time elapsed after sensing the first tray 122 on the first conveyor 120 by the one or more sensors. For example, when the photo eye sensors are unable to sense the presence of any tray or article for a predefined time, the first tine assembly 106 may be transformed back to its home position. While the first tine assembly 106 is transformed back to the home position, the controller may operate the second rotating shaft 216a to transform the second tine assembly 108 from its home position to a work position as shown in FIG. 6.

Figure 6:
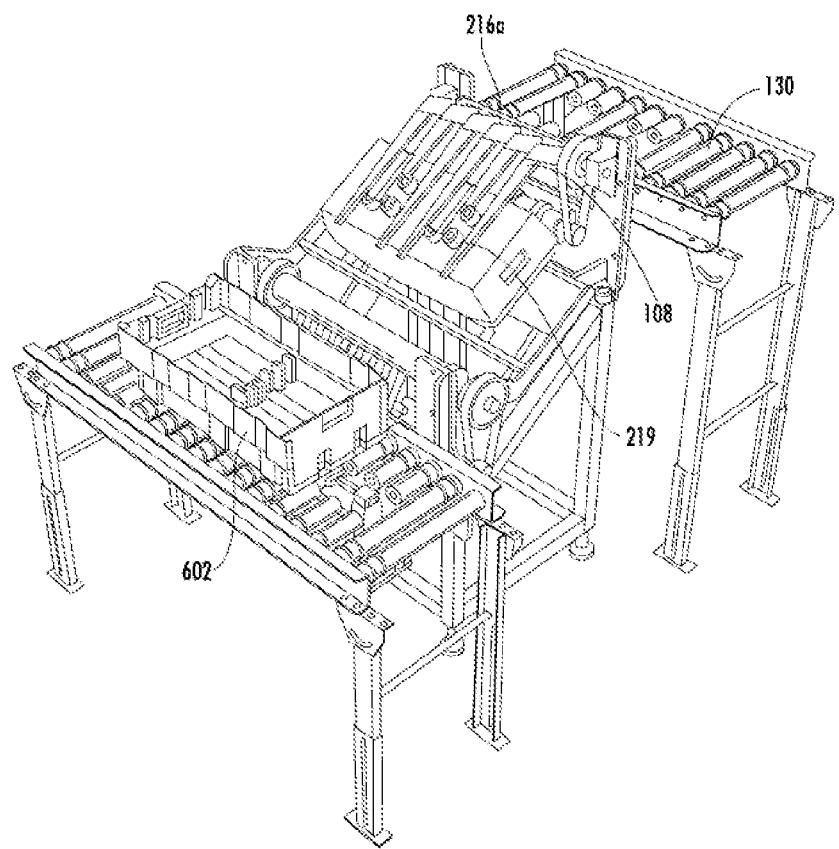
FIG. 6 illustrates a perspective view of the conversion station with the first tray in the second position and a second tine assembly in a work position, in accordance with an embodiment of the present subject matter.

In FIG. 6, it is seen that the second tine assembly 108 along with the suction cups 219 supports the lower surface of the first tray 122 while the paddle assembly 104 is still in the home position. Further, it is seen that a second tray 602 arrives at the first conveyor 120 when the first tray 122 is supported on the paddle assembly 104. In some examples, the first tray 122 and the second tray 602 may have varying length and based on the length, the photo eye sensors of the first conveyor 120 detects that the second tray 602 has arrived at the first conveyor 120. For example, the second tray 602 may be an empty without any item 150 contained therewith. The second tray 602 arrives at the first conveyor 120 while the first tray 122 and the items 150 are supported by the second tine assembly 108 and the paddle assembly 104. In some examples, one or more rollers of the first conveyor 120 is selectively activated to position the second tray 602 at the first position 301. In some examples, one of the clamping devices 126 of the clamping unit 124 may be used as a stopper to stop the second tray 602 at the first position 301. The second tray 602 is positioned at the first position 301 while the first tray 122 is in the second position 501. In some examples, the first tine assembly 106 may support a lower surface of the second tray 602 when positioned in the first position 301. In some examples, the first tine assembly 106 may be positioned beneath the second tray 602 in the first position 301 with a clearance therebetween. While the second tray 602 is positioned on the first conveyor 120 in the first position 301, the second tine assembly 108 transforms back to the home position. When moving to the home position, the second tine assembly 108 moves the first tray 122 to a second conveyor 130 while the item 150 of the first tray 122 continues to remain on the paddle assembly 104 as shown in FIG. 7.

Figure 7:
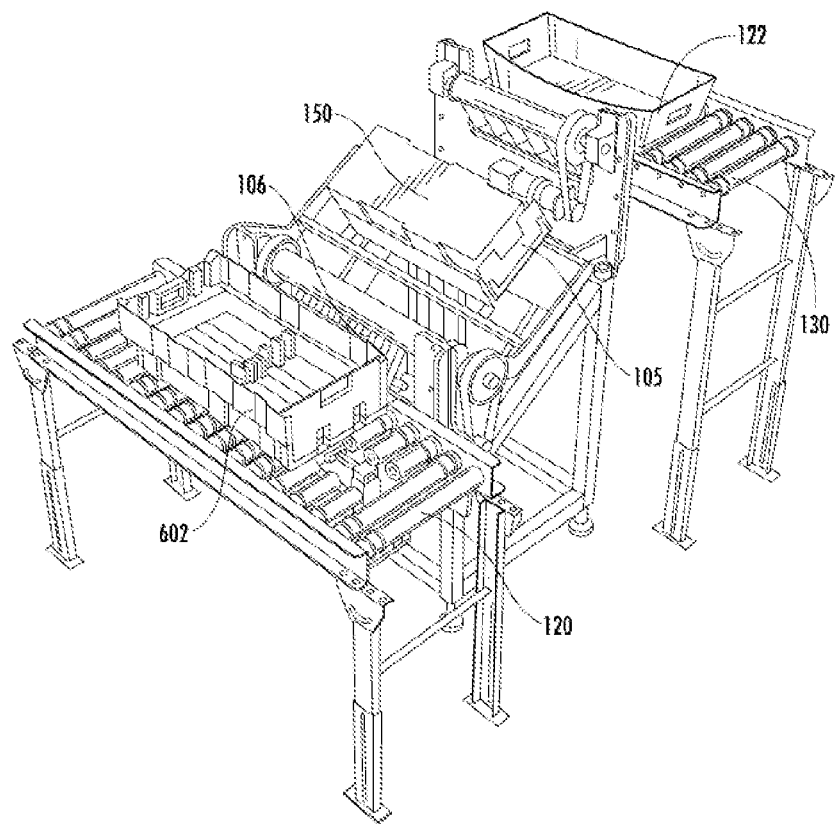
FIG. 7 illustrates a perspective view of the conversion station with a second tray in the first position, in accordance with an embodiment of the present subject matter.

In FIG. 7, it is seen that the suction cups 219 of the second tine assembly 108 grabs, reorients and places the first tray 122 on the second conveyor 130 while the second tine assembly 108 is transformed to the home position. In some examples, after detecting the presence of the second tray 602 on the first conveyor 120, the photo eye sensors of the first conveyor 120 trigger an input signal to the controller to operate the second rotating shaft 216a to transform the second tine assembly 108 to the home position. In some examples, the second tine assembly 108 is transformed to the home position after the first tine assembly 106 is transformed to the home position. In some examples, the second tine assembly 108 is transformed to the home position after a predefined time interval after the arrival of the second tray 602 on the first conveyor 120. In FIG. 7, the first tray 122 is positioned on the second conveyor 130, the second tray 602 is positioned on the first conveyor 120, and the item 150 is positioned on the paddle assembly 104. In FIG. 7, it is seen that the paddle assembly 104, the first tine assembly 106 and the second tine assembly 108 are at the home position with the second tray 602 in the first position 301. While the first tray 122 is moved to the second conveyor 130 by the second tine assembly 108, the second tray 602 is reoriented from the first position 301 to the second position 501 by the first tine assembly 106 as shown in FIG. 8.

Figure 8:
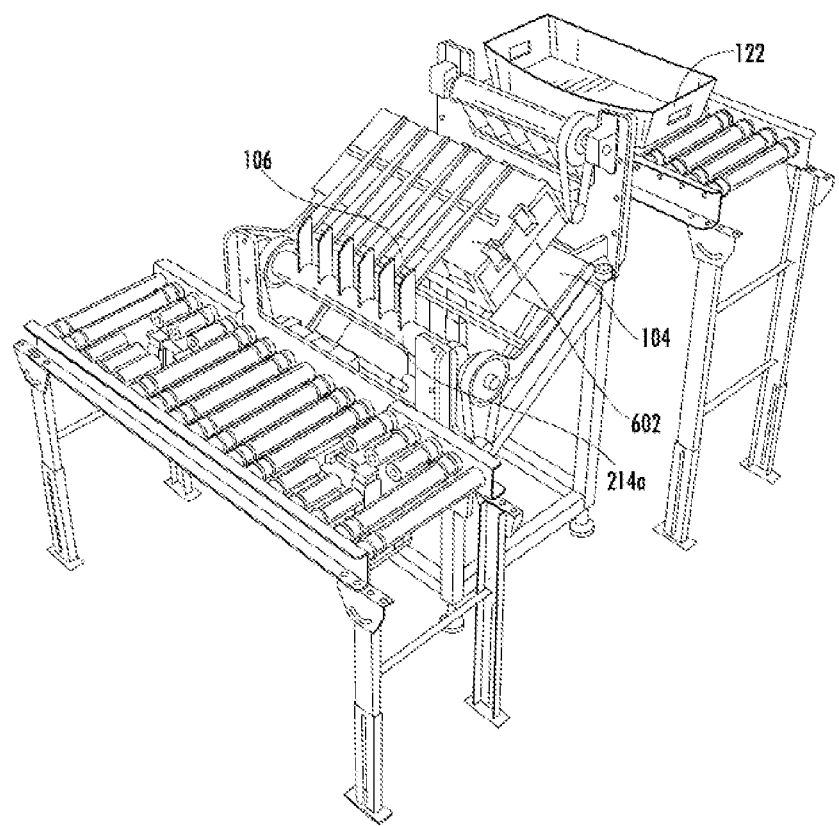
FIG. 8 illustrates a perspective view of the conversion station with the second tray in the second position and the first tines in the work position, in accordance with an embodiment of the present subject matter.

In FIG. 8, it is seen that the first tine assembly 106 is activated by the controller to transform from the home position back to the work position while re-orienting the second tray 602 during the transformation. In some examples, the one or more photo eye sensors of the first conveyor 120 may trigger an input signal to the controller to activate the first tine assembly 106 after detecting the presence of the second tray 602. In some examples, the controller to activate the first tine assembly 106 after a predefined time interval from the activation of the second tine assembly 108. For example, after the controller transforms the second tine assembly 108 from the work position to home position, the controller may activate the first tine assembly 106 to transform to the work position. In some examples, one or more photo eye sensors of the second conveyor 130 may detect the presence of the first tray 122 and may trigger an input signal to the controller to activate the first tine assembly 106. In some examples, images of the conversion station 100 may be captured periodically by one or more imaging devices (not shown) to determine the position of the first tray 122 and the second tray 602. In response to determining the position, an input signal may be transmitted to the controller to activate either of the tine assemblies. In FIG. 8, it is seen that the second tray 602 is positioned on the paddle assembly 104 above and enclosing the item 150 held by the adjustable paddles 105. The second tray 602 fully covers the item 150 and the adjustable paddles 105 of the paddle assembly 104 when positioned at the second position 501. According to an embodiment, while the second tray 602 transforms into the second position 501, the controller activates the first rotating shaft 214a and the third rotating shaft 218a simultaneously to transform the item 150 and second tray 602 back to the first position 301 as shown in FIG. 9.

Figure 9:
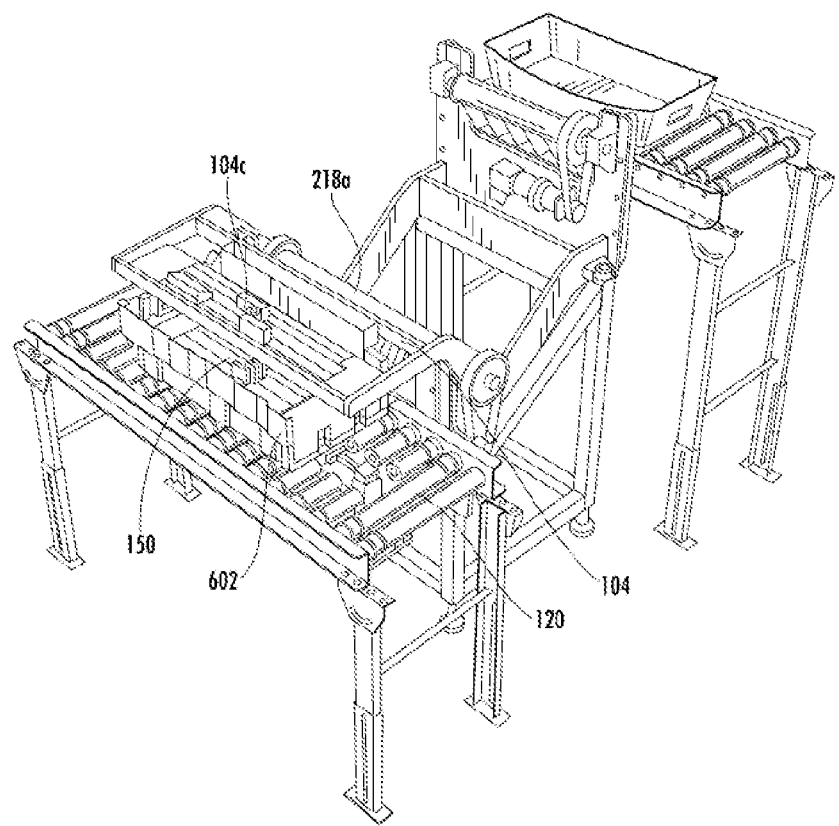
FIG. 9 illustrates a perspective view of the conversion station with the second tray in the first position and the paddle assembly in the work position, in accordance with an embodiment of the present subject matter.

In FIG. 9, it is seen that the second tray 602 is back to the first position 301 on the first conveyor 120 and the item 150 is disposed inside the second tray 602 by the paddle assembly 104. In some examples, the first rotating shaft 214a may be activated initially followed by the activation of the third rotating shaft 218a to place the second tray 602 on the first conveyor 120 and the item 150 into the second tray 602. In some examples, the one or more photo eye sensors may detect that the second tray 602 is no longer present in the first conveyor 120 and in response may trigger an input signal to the controller to activate both the first rotating shaft 214a and the third rotating shaft 218a such that the second tray 602 along with the item 150 is positioned back on the first conveyor 120. In some examples, the first rotating shaft 214a and the third rotating shaft 218a may be activated after a predefined time interval from the second tray 602 being positioned at the second position 501. In FG. 9, it is seen that the paddle assembly 104 is at the work position to transfer the item 150 into the second tray 602. In some examples, the adjustable paddles 105 may be activated after the paddle assembly 104 is transformed to the work position to release the item 150 from the adjustable paddles 105. For example, the adjustable paddles 105 are retracted to release the item 150 into the second tray 602. When the item 150 is released from contact with the adjustable paddles 105, the paddle assembly 104 is transformed back into the home position. Therefore, the paddle assembly 104, the first tine assembly 106 and the second tine assembly 108 operates in conjunction and transforms from the home position to work position or vice-versa to transfer an item 150 or group of items 150 from the first tray 122 to the second tray 602 without any human intervention.

Figure 10:
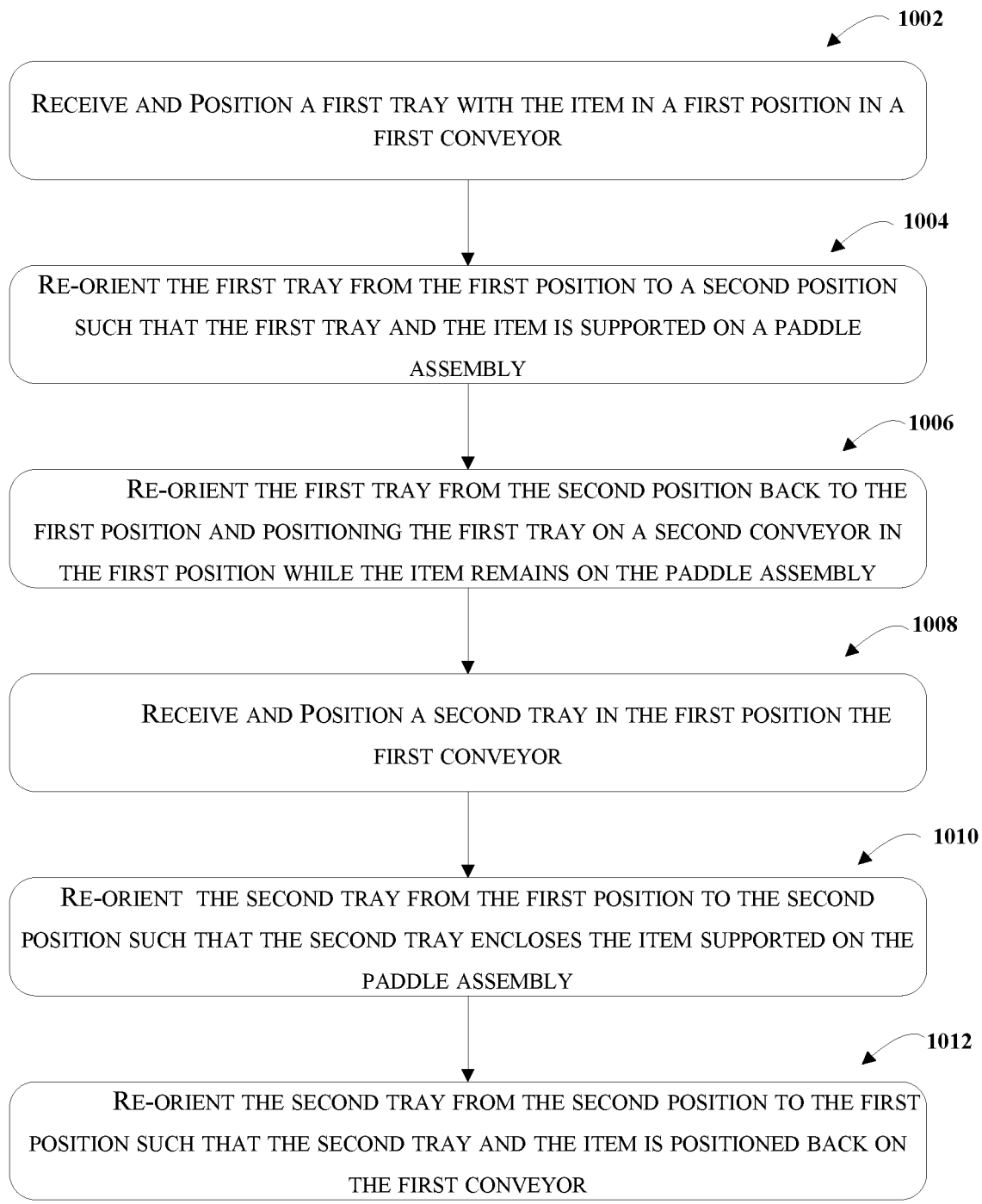
FIG. 10 illustrates an exemplary flow chart showing a method for moving an item from a first tray to a second tray in accordance with an embodiment of the present subject matter.

FIG. 10 illustrates an exemplary flow chart showing a method for moving an item from a first tray to a second tray in accordance with an embodiment of the present subject matter. At step 1002, the method includes receiving and positioning a first tray with the item in a first position in a first conveyor. At step 1004, the method includes re-orientating the first tray from the first position to a second position such that the first tray and the item are supported on a paddle assembly. At step 1006, the method includes re-orienting the first tray from the second position back to the first position and positioning the first tray on a second conveyor in the first position while the item remains on the paddle assembly. At step 1008, the method includes receiving and positioning a second tray in the first position on the first conveyor. At step 1010, the method includes re-orienting the second tray from the first position to the second position such that the second tray encloses the item supported on the paddle assembly. At step 1012, the method includes re-orienting the second tray from the second position to the first position such that the second tray and the item are positioned back on the first conveyor.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, comprises compact disc (CD), laser disc, optical disc, digital versatile disc (DVD), floppy disk, and blu-ray disc where disks usually reproduce data magnetically, while discs reproduce data optically with lasers. Combinations of the above should also be comprised within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The foregoing description of an embodiment has been presented for purposes of illustration and description. It is not intended to be exhaustive or to limit the disclosure to the precise form disclosed. Obvious modifications or variations are possible in light of the above teachings. The embodiment was chosen and described in order to best illustrate the principles of the disclosure and its practical application to thereby enable one of ordinary skill in the art to best utilize the disclosure in various embodiments and with various modifications as are suited to the particular use contemplated. Although only a limited number of embodiments of the disclosure are explained in detail, it is to be understood that the disclosure is not limited in its scope to the details of construction and arrangement of components set forth in the preceding description or illustrated in the drawings. The disclosure is capable of other embodiments and of being practiced or carried out in various ways. Also, in describing the embodiment, specific terminology was used for the sake of clarity. It is to be understood that each specific term comprises all technical equivalents which operate in a similar manner to accomplish a similar purpose.

The invention claimed is:

1. A conversion station for moving an item from a first tray to a second tray, comprising:
    a first conveyor to receive the first tray and the second tray;
    a second conveyor positioned at a predefined height offset from the first conveyor to receive the first tray after the item has been removed from the first tray; and
    a conversion assembly positioned in between the second conveyor and the first conveyor, wherein the conversion assembly comprises:
        a first tine assembly comprising one or more tines coupled to a first rotating shaft;
        a second tine assembly comprising one or more tines coupled to a second rotating shaft, wherein the second tine assembly is positioned at a predefined height offset from the first tine assembly, wherein the first tine assembly is configured to facilitate emptying the item from the first tray onto a paddle assembly of the conversion assembly and the second tine assembly is configured to facilitate moving the first tray to the second conveyor while the item remains on the paddle assembly; and
        wherein the first tine assembly alters an orientation of the second tray to a position to receive the item from the paddle assembly, and wherein the paddle assembly is configured to move the second tray and the item back onto the first conveyor.

2. The conversion station of claim 1, wherein the first conveyor comprises a clamping unit with at least two clamping devices positioned opposite to each other to engage with the item in the first tray on the first conveyor, wherein each of the clamping devices is horizontally and vertically adjustable.

3. The conversion station of claim 2, wherein the at least two clamping devices are actuated along a vertical axis and a horizontal axis, wherein each of the clamping devices is vertically actuated using a scissor style linkage mechanism operated by a first electric motor, and wherein each of the clamping devices is horizontally actuated using a common lead screw with right-hand threads on one half and left-hand threads on the other half and operated by a second electric motor.

4. The conversion station of claim 3, wherein the first conveyor comprises additional openings to accommodate the at least two clamping devices underneath the first conveyor, wherein the additional openings provide a clearance for the at least two clamping devices to be vertically lifted from underneath the first conveyor.

5. The conversion station of claim 1, wherein the paddle assembly comprises at least two adjustable paddles coupled to a third rotating shaft, wherein the paddle assembly is positioned in between and offset from the first tine assembly and the second tine assembly.

6. The conversion station of claim 5, wherein the first rotating shaft, the second rotating shaft, and the third rotating shaft are attached at different heights offset from each other on a support structure of the conversion assembly.

7. The conversion station of claim 5, wherein each of the first rotating shaft, the second rotating shaft, and the third rotating shaft is driven by at least one drive unit comprising a drive motor, a drive shaft and a timing belt.

8. The conversion station of claim 1, wherein the one or more tines of the second tine assembly comprise at least one gripper to grip the first tray and move the first tray to the second conveyor.

9. The conversion station of claim 1, wherein the conversion assembly further comprises a chute and a catch pan positioned at a bottom of the support structure to receive one or more items slipping from the conversion assembly when moving the one or more items from the first tray to the second tray.

10. The conversion station of claim 1, wherein the first tine assembly further comprise solenoids that are selectively activated to grip and position the first tray and the second tray.

11. The conversion station of claim 1, wherein the first conveyor and the second conveyor are roller conveyors with gaps to accommodate the one or more tines therebetween.

12. A conversion assembly for transferring an item from a first tray to a second tray, wherein the conversion assembly comprises:
   a paddle assembly;
   a first tine assembly comprising one or more tines coupled to a first rotating shaft;
   a second tine assembly comprising one or more tines coupled to a second rotating shaft, wherein the second tine assembly is positioned at a predefined height offset from the first tine assembly, wherein the first tine assembly is configured to facilitate emptying the item from the first tray onto the paddle assembly of the conversion assembly and the second tine assembly is configured to facilitate moving the first tray to a second conveyor while the item remains on the paddle assembly; and
   wherein the first tine assembly alters an orientation of the second tray to a position to receive the item from the paddle assembly, and wherein the paddle assembly is configured to move the second tray and the item back onto a first conveyor.

13. The conversion assembly of claim 12, wherein the paddle assembly comprises at least two adjustable paddles coupled to a third rotating shaft, wherein the paddle assembly is positioned in between and offset from the first tine assembly and the second tine assembly.

14. The conversion assembly of claim 13, wherein the at least two adjustable paddles are horizontally adjustable within paddle mounting slots provided on the paddle assembly based on a size of the item on the incoming tray.

15. The conversion assembly of claim 13, wherein the first rotating shaft, the second rotating shaft, and the third rotating shaft are attached at different heights offset from each other on a support structure of the conversion assembly.

16. The conversion assembly of claim 13, wherein each of the first rotating shaft, the second rotating shaft, and the third rotating shaft is driven by at least one drive unit comprising a drive motor, a drive shaft and a timing belt.

17. The conversion assembly of claim 15, wherein the support structure comprises one or more support frames to support the first tine assembly, the paddle assembly and the second tine assembly.

18. The conversion assembly of claim 17, wherein the one or more support frames comprise a first support frame, a second support frame and a third support frame, wherein the third support frame is positioned above and parallel to the first support frame and offset at a predetermined height from first support frame, and wherein the second support frame is inclined at an angle and substantially perpendicular with respect to the first support frame and the third support frame.

19. The conversion assembly of claim 1, wherein the first tray and the second tray are in an inverted position when supported on the paddle assembly.

20. The conversion assembly of claim 1, wherein the one or more tines are altered from a home position to a work position and vice-versa to alter the orientation of the first tray and the second tray.

* * * * *